(12) United States Patent
Yu et al.

(10) Patent No.: US 11,604,108 B2
(45) Date of Patent: Mar. 14, 2023

(54) TACTILE SENSORS AND METHODS (71) Applicant: The Hong Kong University of Science and Technology, Kowloon (HK)

(72) Inventors: Hongyu Yu, Kowloon (HK); Michael Yu Wang, Kowloon (HK); Xia Chen, Kowloon (HK); Yazhan Zhang, Kowloon (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 403 days.

(21) Appl. No.: 16/890,211

(22) Filed: Jun. 2, 2020

(65) Prior Publication Data

US 2020/0393313 A1    Dec. 17, 2020

Related U.S. Application Data

(60) Provisional application No. 62/921,422, filed on Jun. 17, 2019.

(51) Int. Cl.
*G01L 5/16* (2020.01)
*G01L 5/166* (2020.01)
*G01L 1/24* (2006.01)
*B25J 13/08* (2006.01)

(52) U.S. Cl.
CPC .............. *G01L 5/166* (2013.01); *G01L 1/241* (2013.01); *G01L 1/242* (2013.01); *G01L 1/247* (2013.01); *B25J 13/084* (2013.01)

(58) Field of Classification Search
CPC ......... G01L 5/166; G01L 1/241; G01L 1/242; G01L 1/247; G01L 1/25; B25J 13/084; G01B 11/24; G01B 11/02
See application file for complete search history.

(56) References Cited

U.S. PATENT DOCUMENTS

| 6,909,084 | B2 | 6/2005 | Tachi et al. |
| 7,297,926 | B2* | 11/2007 | Kaluzhny ......... H01L 27/14685 257/40 |
| 7,460,964 | B2 | 12/2008 | Mizota et al. |
| 8,168,935 | B2* | 5/2012 | Daiku ..................... G01L 1/247 250/214 R |

(Continued)

FOREIGN PATENT DOCUMENTS

EP          3267359 A1    10/2018

OTHER PUBLICATIONS

Donlon et al., "GelSlim: A High-Resolution, Compact, Robust, and Calibrated Tactile-sensing Finger", International Conference on Intelligent Robots and Systems (IROS) Madrid, Spain, Oct. 1-5, 2018, pp. 1927-1934.

(Continued)

*Primary Examiner* — Freddie Kirkland, III
(74) *Attorney, Agent, or Firm* — Amin, Turocy & Watson, LLP (57) ABSTRACT

Various tactile sensors and associated methods are enabled. For instance, a sensing apparatus comprises a photosensitive sensor. A compound-eye structure is on the photosensitive sensor and an elastomer layer is on the compound-eye structure. A reflective layer is on the elastomer layer, opposite the compound-eye structure and a light source emits light between the reflective layer and the compound-eye structure.

20 Claims, 11 Drawing Sheets

(56) References Cited

U.S. PATENT DOCUMENTS

| | | | |
|---|---|---|---|
| 8,411,140 | B2 | 4/2013 | Adelson |
| 9,652,696 | B2 * | 5/2017 | Won .................. A61B 5/442 |
| 10,038,854 | B1 | 7/2018 | Cooper et al. |
| 10,083,335 | B2 | 9/2018 | Zhang |
| 10,108,841 | B2 * | 10/2018 | Lee .................. G02B 27/30 |
| 10,147,757 | B2 * | 12/2018 | Lee .................. G06V 40/1318 |
| 10,176,355 | B2 * | 1/2019 | Smith .................. G02F 1/13338 |
| 10,360,430 | B2 | 7/2019 | Zhang et al. |
| 10,482,304 | B2 | 11/2019 | Zhang |
| 10,885,303 | B2 * | 1/2021 | Fan .................. H04N 5/2254 |
| 10,957,731 | B1 * | 3/2021 | Hsieh .................. H01L 27/14627 |
| 11,126,305 | B2 * | 9/2021 | Xiang .................. G06V 40/1318 |
| 11,239,275 | B2 * | 2/2022 | Yeke Yazdandoost .................. G06V 40/1318 |
| 2003/0178556 | A1 * | 9/2003 | Tachi .................. G01L 1/247 250/208.1 |
| 2007/0040107 | A1 * | 2/2007 | Mizota .................. G01L 5/228 250/221 |
| 2017/0351898 | A1 | 12/2017 | Zhang |
| 2018/0012069 | A1 * | 1/2018 | Chung .................. G06V 40/1365 |

OTHER PUBLICATIONS

Sato et al., "Finger-Shaped GelForce: Sensor for Measuring Surface Traction Fields for Robotic Hand", DOI 10.1109/ToH.2009.47, vol. 3, No. 1, Jan.-Mar. 2010, pp. 37-47.

Yuan et al.,"Measurement of Shear and Slip with a GelSight Tactile Sensor", International Conference on Robotics and Automation (ICRA) Washington State Convention Center Seattle, Washington, May 26-30, 2015, pp. 304-311.

Yamaguchi et al., "Combining Finger Vision and Optical Tactile Sensing: Reducing and Handling Errors While Cutting Vegetables", 16th International Conference on Humanoid Robots (Humanoids) Cancun, Mexico, Nov. 15-17, 2016, pp. 1045-1051.

Sferrazza et al., "Design, Motivation and Evaluation of a Full-Resolution Optical Tactile Sensor", DOI: 10.3390/s19040928, Feb. 22, 2019, vol. 19, No. 4, 928, 22 pages.

Li et al., "End-to-end pixelwise surface normal estimation with convolutional neural networks and shape reconstruction using GelSight sensor", Proceedings of the 2018 IEEE International Conference on Robotics and Biomimetics, Dec. 12-15, 2018, pp. 1292-1297.

* cited by examiner

TACTILE SENSORS AND METHODS

CROSS REFERENCE TO RELATED APPLICATION

The subject patent application claims priority to U.S. Provisional Patent Appln. No. 62/921,422, filed Jun. 17, 2019, and entitled "A Tactile Sensor Skin inspired by Compound Eye," the entirety of which application is hereby incorporated by reference herein.

TECHNICAL FIELD

The present disclosure generally relates to tactile skin sensors and associated methods.

BACKGROUND

Machines and robotic equipment have worked their way into nearly every fabric of human existence. Such equipment affords increased efficiencies, accuracies, and precision. Sensors inherently play an integral role in enabling machines to carry out such tasks.

A variety of sensors currently exist. Such sensors developed over the last several decades have a variety of transducing methods including piezoelectric and piezoresistive methods. Such sensors can cover broad scales from micro to macro with a wide range of applications. However, such sensors lack the ability to perform high-resolution spatial mapping and three-dimensional measuring due to their inherent high complexity in mechanical structure, readout circuit design, and interfaces.

Vision-based tactile sensors thrive and appear in a variety of robotic systems due to easier fabrication, high-resolution, and multi-axial deformation sensing advantages. Such sensors can utilize recent advancements in complementary metal-oxide-semiconductor (CMOS) image sensors. Additionally, high-density spatial mapping capabilities are easier-achieved as image sensor's readout circuits are mature and can be integrated with the sensors.

However, current vision-based tactile sensors are not utilized in state-of-the-art industrial and medical robotics due to relative bulky size, high cost, and repeatability issues. Therefore, there exists a need for improved vision-based tactile sensors.

The above-described background relating to tactile skin sensors is merely intended to provide a contextual overview of some current issues and is not intended to be exhaustive. Other contextual information may become further apparent upon review of the following detailed description.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Embodiments described herein provides apparatuses and methods that enable high-quality, low-cost, miniaturized, simple-to-manufacture, and adaptable vision-based tactile sensors. Embodiments described herein can comprise an array of closely arranged, independent visualization units. High spatial-density of tactile mapping functions for surface deformation and contact force can be achieved. In this regard, multi-dimensional contact information can be captured.

Embodiments described herein can comprise a sensing device comprising an elastomer layer coated with a flexible reflective film forming a top layer. Markers can be coated on a bottom-side of the reflective film. Markers can comprise an array of circles or other structures, which can be optimized for easy image processing. The reflective layer can also enable contrast-enhancement for marker image extraction during image processing, and can also act as a protective layer for the sensing device.

An additional protective layer can be added between the elastomer layer and the reflective layer, or above the reflective layer.

Deformation of markers can be captured by an optical imaging system, which can utilize a compound-eye inspired structure (e.g., a middle layer) and CMOS sensor(s) (e.g., a bottom layer). A middle layer can comprise an array of pinhole structures residing underneath an elastomer layer. A rigid and transparent layer can be located between the elastomer layer and pinhole array structure. A bottom layer can comprise the CMOS image sensor chip, which can capture movements of markers and send a signal to an image processing unit through interfacing circuits. A light source can be placed, for example, aside each pinhole or edge(s) of a sensor system to provide light for imaging. Light sources can include, for instance, light-emitting-diodes (LEDs), optical fibers, or other types of light sources.

Sensors described herein can image three-dimensional movements and shape changes of markers with individual sensing units through cross-referencing images from adjacent sensing units, from which deformation and slip-ratio-distribution of an entire surface can be derived. Contact force and its distribution at a surface can also be determined with Young's modulus of the elastomer layer. Another method is to collect large numbers of images under different applied force and train algorithm models with respect to the calibration readings from a standard force sensor.

Resolution of a sensor can depend on an associated CMOS imager's pixel size and/or on optical magnification of a pinhole structure system. Sensor thickness can depend on heights of individual optical units, which can vary from, for example, several microns to several centimeters. A sensing area of a system can be equal to a size of a CMOS imager (e.g., in mm or cm). An array of CMOS imagers can be utilized, for instance, for a larger area to be sensed. A pinhole structure system can be fabricated using microfabrication technology, 3D printing, or other methods to ensure high-precision, reliability, repeatability, and low-cost.

In one embodiment, a sensing apparatus is described herein. The sensing apparatus can comprise a photosensitive sensor, a compound-eye structure on the photosensitive sensor, an elastomer layer on the compound-eye structure, a reflective layer on the elastomer layer, opposite the compound-eye structure, and a light source that emits light between the reflective layer and the compound-eye structure.

Compound-eye inspired structures described herein can comprise pinhole-based structures. Light sources described herein can comprise LEDs or optical fibers. Light sources can comprise a group of lights adjacently received at a side of each hole of the group of pinholes. Markers can be received on a surface of the elastomer layer, opposite the pinhole structure. Deformation of the sensing apparatus can cause a marker of the markers to change position relative to the photosensitive sensor, and the photosensitive sensor can detect the change of position of the marker. A transparent rigid layer can be between the elastomer layer and the compound-eye structure. A first transparent protective layer can be on the reflective layer. A second transparent protective layer can be on the reflective layer, opposite the first transparent protective layer.

In another embodiment, a tactile sensing apparatus is described herein. The tactile sensing apparatus can comprise a complementary metal oxide semiconductor sensor, a lens structure on the complementary metal oxide semiconductor sensor, an elastomer layer on the pinhole structure, a reflective layer on the elastomer layer opposite the pinhole structure, and a light source on a surface of the elastomer layer.

In a further embodiment, a method is described herein. The method can comprise disposing a pinhole-lens on a photosensitive sensor, disposing an elastomer layer on the pinhole-lens wherein the elastomer layer comprises markers on a surface of the elastomer layer, disposing a reflective layer on the elastomer layer opposite the pinhole plate, and disposing a light source between the reflective layer and the pinhole-lens.

The pinhole-lens can comprise a light passage. The markers can contrast with the reflective layer and/or can be distributed according to a pattern. The pinhole structure can comprise a circular hole etched into a first side of a material and a square hole etched into a second side, opposite the first side, of the material.

The above aspects of the disclosure and/or other features of respective embodiments thereof are described in further detail with respect to the respective drawings below. It should be appreciated that additional manifestations, configurations, implementations, protocols, etc. can be utilized in connection with the following components described herein or different/additional components as would be appreciated by one skilled in the art.

Figure 1:
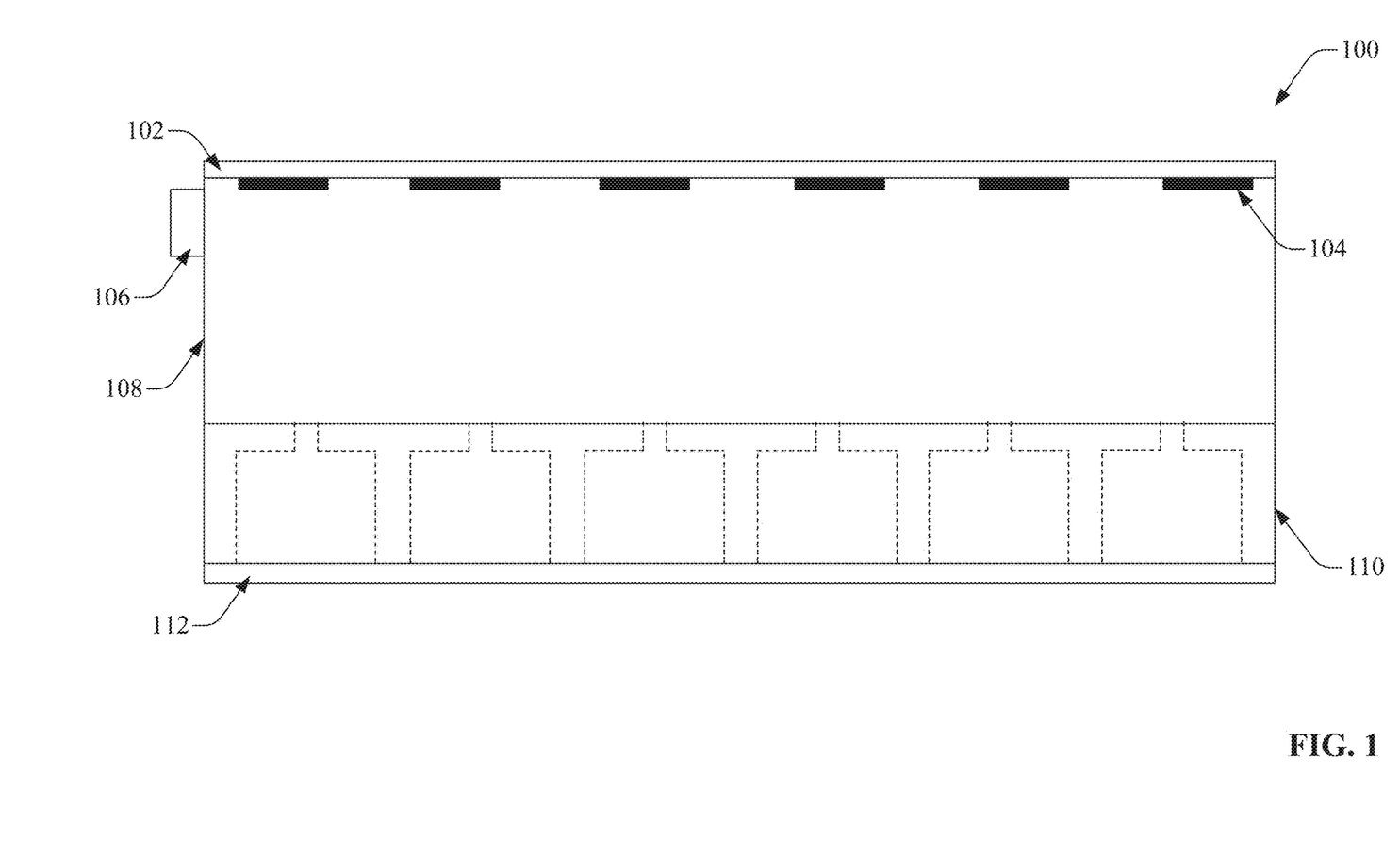
FIG. 1 illustrates a tactile sensor in accordance with one or more embodiments described herein.

With reference to FIG. 1, illustrated is an exemplary tactile sensor 100 in accordance with various embodiments disclosed herein. The tactile sensor 100 can comprise a reflective layer 102, an elastomer layer 108 on which markers 104 are located, one or more LEDs 106, pinhole-based structure(s) 110, and a CMOS sensor 112 (e.g., photosensitive sensor).

The reflective layer 102 can be flexible and highly reflective of light. The shape of the reflective layer 102 can change in response to external touching/pressure/deformation. The reflective layer 102 can comprise silicone, Parylene C, Polyimide, other polymers, other inorganic materials, or other materials that can be reversibly deformed by applied force. The reflective layer 102 can additionally function as a protective layer.

According to an embodiment, an additional layer (e.g., a protective layer) can be added atop or underneath the reflective layer 102. This can protect the tactile sensor from environmental factors such a wear/tear, moisture, light, chemical instruction, impacts, etc. According to an example, when an additional (transparent) protective layer is added, then the reflective layer 102 can be fixed on the protective layer. The protective layer can be a thin, flexible film (e.g., 2-4 micron thick plastic film). The protective layer can comprise hardened Parylene C. According to an example, the protective layer can be attached to the elastomer layer 108.

According to an embodiment, LED 106 can be fixed on a side of the tactile sensor 100. Other embodiments can utilize multiple of LED 106 on a single tactile sensor 100. It can be additionally appreciated that the LED 106 can be located on any side of the elastomer layer 104 or tactile sensor 100 such that the LED 106 can provide enough light to make all of the markers 104 visible to the CMOS sensor 112. According to an embodiment, LED 106 can comprise a white LED, however, other colors can be used. For instance, LEDs of a variety of wavelengths can be implemented. Further, other forms of light sources can be utilized in place of or in combination with LED 106, such as optical fibers or other types of light sources.

The elastomer layer 108 can be transparent and elastic. The thickness and materials can vary depending on the tactile sensing requirements of the associated tactile sensor 100. According to an example, the elastomer layer 108 can comprise Polydimethylsiloxane (PDMS) and the thickness of the elastomer layer can be 1.5 mm. Shape of the elastomer layer changes in response to external contact/pressure. Movement of markers 104 can indicate such deformation. Further, Young's modulus of the elastomer layer 108 can be utilized to determine force distribution of the externally applied pressure. An alternative way to obtain force distribution is gaining a large number of images under different stimuli and training algorithms model respect to the readings from standard force sensors.

Markers 104 can be coated on the elastomer 108. Motion of the markers 104 can be caused by force applied to a surface of the tactile sensor 100. Movement of the markers 104 can be captured for image processing (e.g., by CMOS sensor 112). Markers 104 are generally thin though thickness of the markers 104 can vary by embodiment and implementation. For example, in some embodiments, the thickness of the markers 104 are negligible as compared to the thickness of the elastomer 108. Markers 104 can comprise, for instance, one or an array of dots, one or an array of circles, or one or an array of other shapes or random patterns suitable for image recognition and image stitching. According to an example, markers 104 can comprise copper dots. Markers 104 can comprise one or more materials, which can be coated on the reflective layer 102 or elastomer layer 108. Markers 104 can contrast with the reflective layer 102 to facilitate improved imaging. Markers 104 can deform when a top side of the reflective layer 102 received an applied force. The motion or deformation of the markers 104 can be recorded by the CMOS sensor 112 and the recorded image(s) can be processed for further deformation determination and force mapping. Lighting for the CMOS sensor 112 to observe the motion of the markers 104 can be provided by the LED 106.

Pinhole-based structures 110 can be located under the elastomer layer 108 and fixed to the elastomer layer 108. The pinhole-based structures can be located on a top surface of the CMOS sensor 112. According to an embodiment, a transparent rigid layer can be placed between the elastomer layer 108 and pinhole-based structures 110. According to another embodiment, the pinhole-based structures 110 can be double-sided such that a first side of a material or layer can be etched to form an array of circular holes and a second side of a material or layer can be etched to form an array of deep square holes. Diameters and heights of the circular holes can vary. Further, side length and height of the square holes can additionally vary. According to an example, a circle hole diameter can be 32 µm, circle hole height can be 10 µm, square hole side length can be 500 µm, and square hole height can be 500 µm. However, such dimensions can vary according to image requirements. It can be appreciated that, according to an embodiment, the square holes are not etched completely trough a material layer (e.g., elastomer, silicon, etc.) and the circular hole (e.g., pinhole) can be etched through the remainder of the material layer comprising the square hole to form a pinhole light passage. Utilization of the square holes can enable increased resolution.

Figure 2:
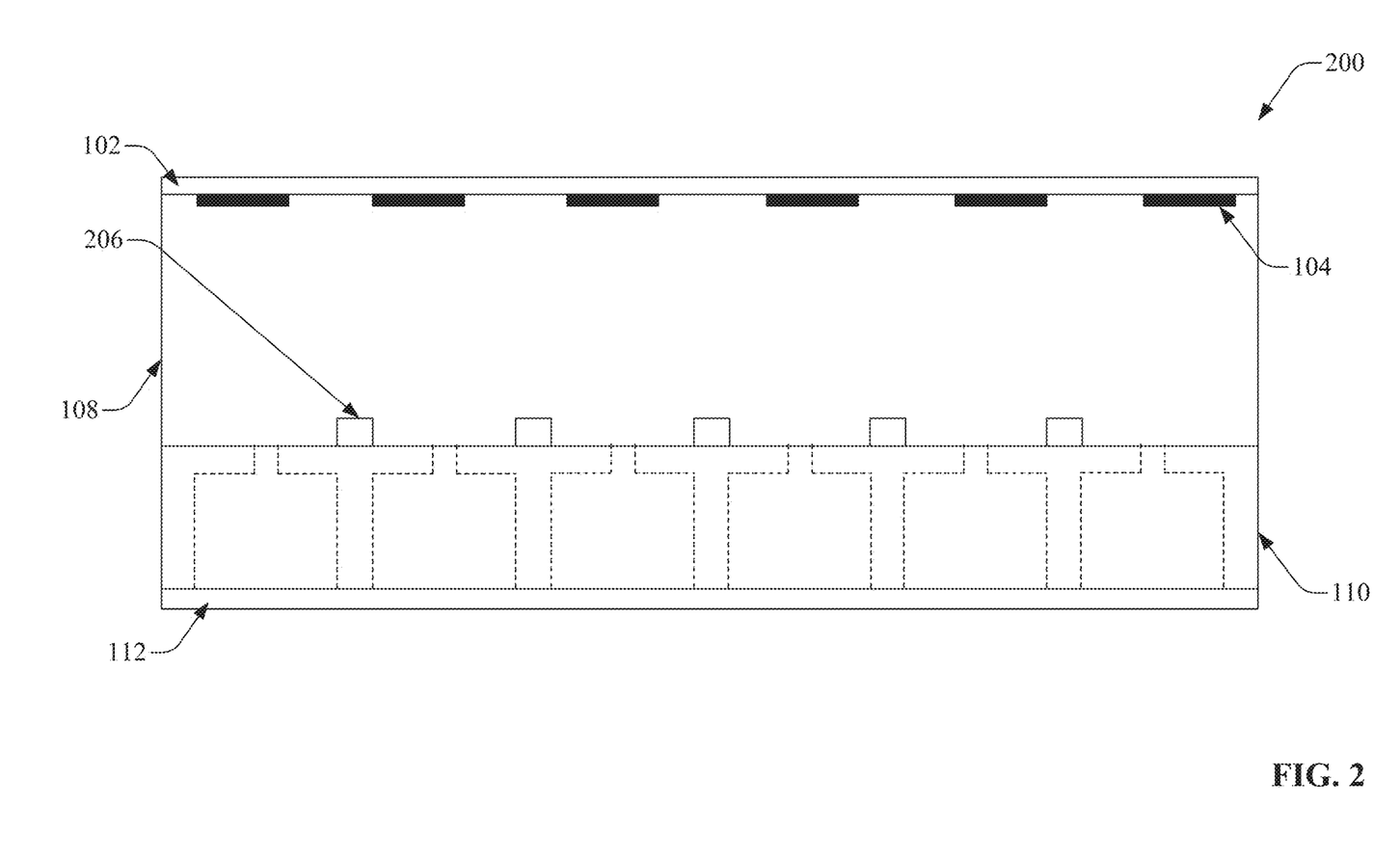
FIG. 2 illustrates a tactile sensor in accordance with one or more embodiments described herein.

Turning now to FIG. 2, illustrated is an exemplary tactile sensor 200 in accordance with various embodiments disclosed herein. The tactile sensor 200 can comprise a reflective layer 102, an elastomer layer 108 on which markers 104 are located, one or more LEDs 206, pinhole-based structure(s) 110, and a CMOS sensor 112.

It can be appreciated that tactile sensor 200 is similar to tactile sensor 100, however, with tactile sensor 200, LEDs 206 are located at edges of pinhole-based structures 110. Regarding LEDs 206, other light sources, such as optical fibers, can be utilized instead of or in combination with LEDs.

Figure 3:
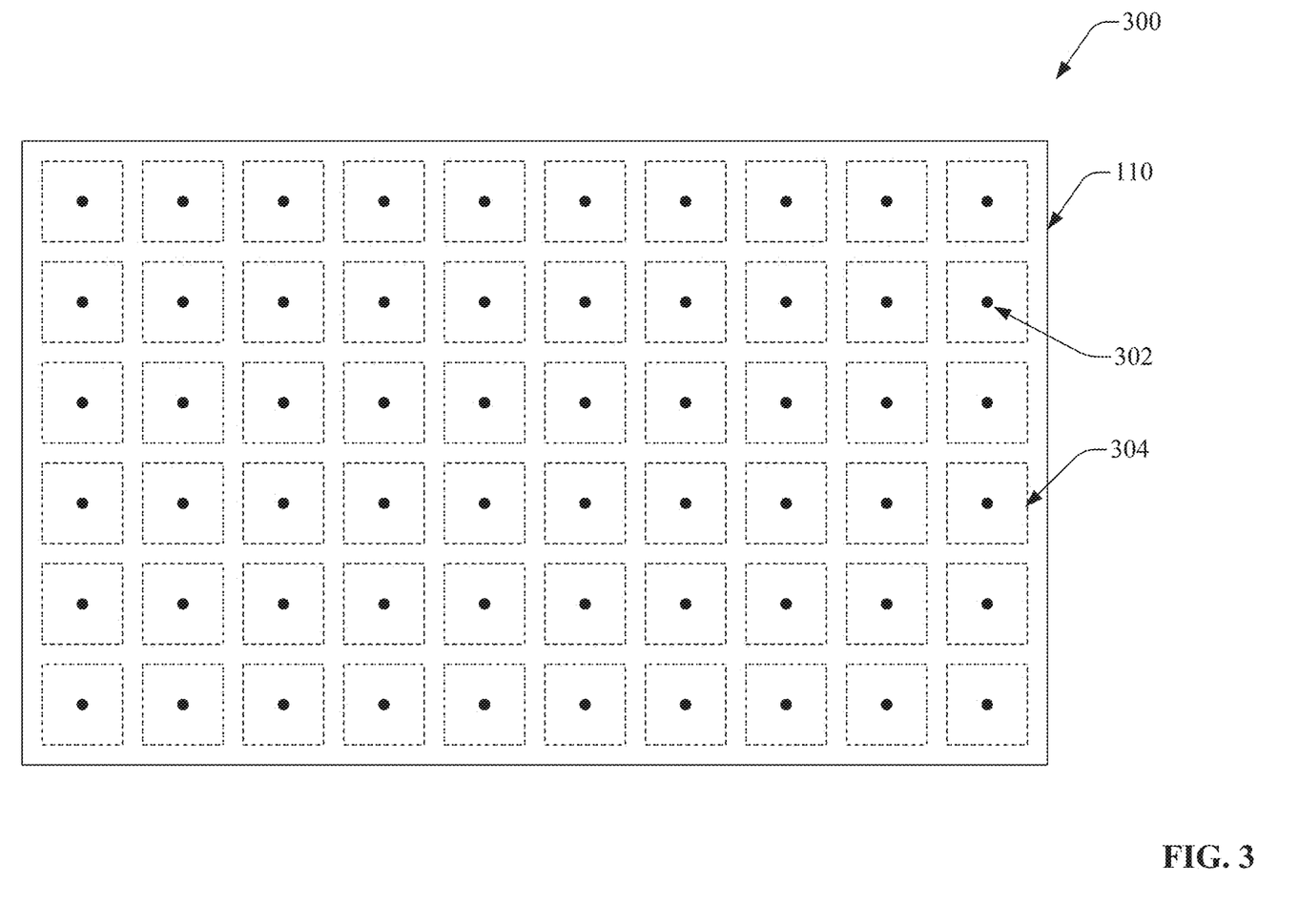
FIG. 3 illustrates a tactile sensor in accordance with one or more embodiments described herein.

With reference to FIG. 3, illustrated is an exemplary tactile sensor 300 in accordance with various embodiments disclosed herein. It can be appreciated that tactile sensor 300 is a top view of the tactile sensor 100 or 200 (with light source(s) not shown). The tactile sensor 300 can comprise a pinhole-based structure 110, an array of circular holes 302, and an array of square holes 304.

According to an embodiment, the array of circular holes 302 and square holes 304 is six-by-ten, though other arrangements or hole counts can be utilized. According to yet another embodiment, the pinhole-based structure 110 can comprise silicon.

Each circular hole 302 can be in the center of the square hole (when viewed from the top as in FIG. 3), though it is not required to be for all applications. The diameter of the circular hole 302 can range from one micron to one-hundred microns. The height of the circular hole 302 and square hole 304 can range from a few microns to several millimeters, according to sensing requirements. The pinhole-based structure 110 can be fabricated by micro-machining in which an array of circular holes 302 can be etched on a top side and an array of square holes 304 can be etched on a bottom side to form a light passage. Other fabrication methods (e.g., 3D printing, etc.) can be utilized to create the pinhole-based structure 110. For instance, a silicon wafer can be used as a base material for the pinhole-based structure 110. According to an embodiment, the distance between adjacent square holes 304 can be 100 µm, though distances between square holes 304 can range from several microns to millimeters, depending on sensing requirements. Walls can be located between the square holes 304, which can isolate the square holes 304 from each other. In this regard, light entering one square hole would not affect an adjacent square hole, or any other square hole. In other words, light does not leak from one square hole 304 to another. It can be appreciated that pinhole-based structures 110 can utilize other shaped holes (e.g., rectangular, oval, hexagon, or other shapes, even irregular shapes). Further, arrays of holes can be irregular as opposed to a grid as depicted in FIG. 3.

Figure 4:
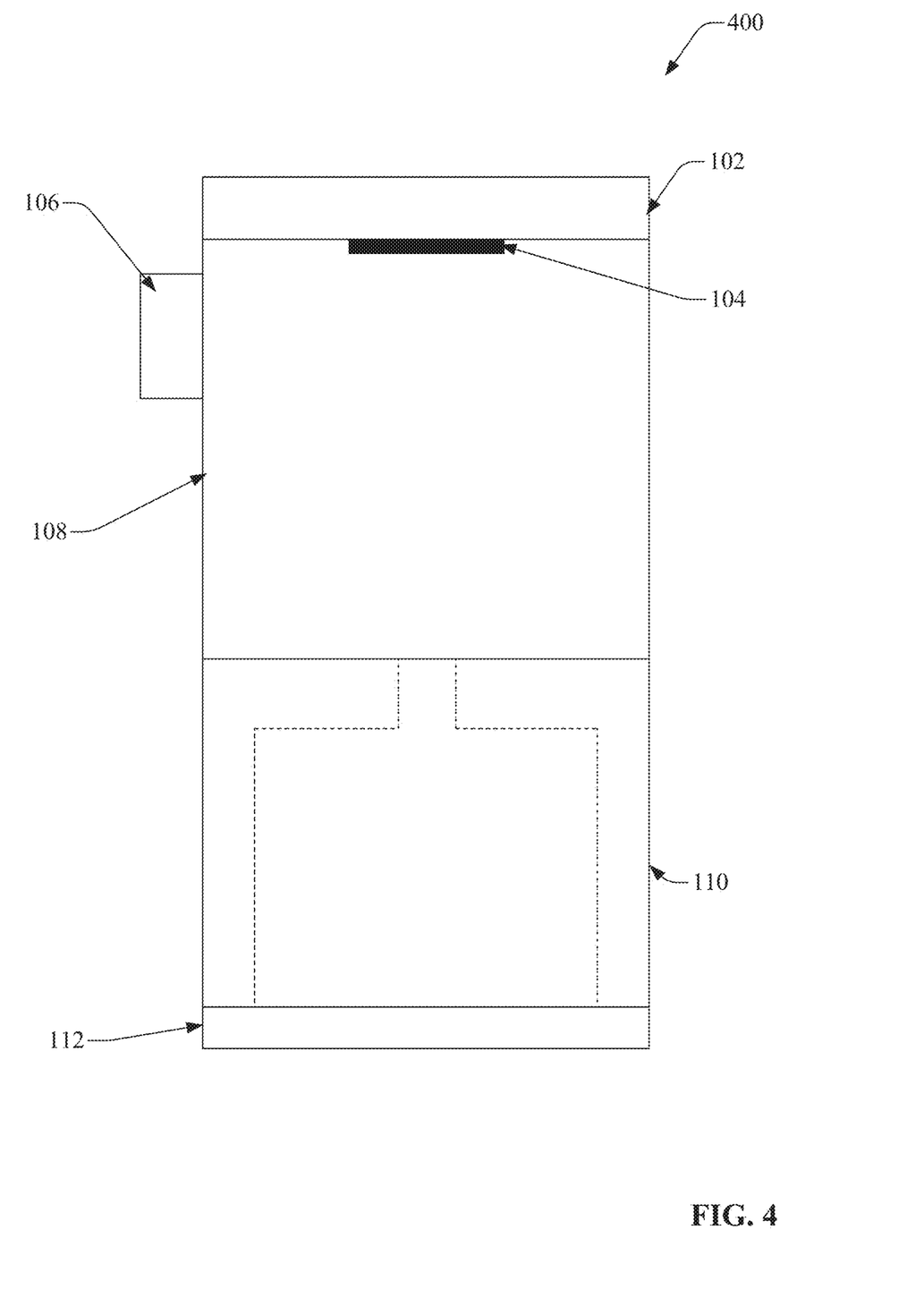
FIG. 4 illustrates a tactile sensor in accordance with one or more embodiments described herein.

Turning now to FIG. 4, there is illustrated a tactile sensor 400 in accordance with one or more various embodiments disclosed herein. The tactile sensor 400 can comprise a reflective layer 102, an elastomer layer 108 on which marker(s) 104 are located, one or more LEDs 106, a pinhole-based structure 110, and a CMOS sensor 112.

Tactile sensor 400 is a single-hole tactile sensor. In this regard, there is only one pinhole-based structure 110. Marker(s) 104 can comprise a single dot pattern, an array of circles, or another ordered or random pattern, which can be further processed. It can be appreciated that one or a group of markers 104 can be utilized in the tactile sensor 400.

Regarding FIGS. 5-9, though some components such as LEDs, markers, reflective layers etc. are not depicted, they can still exist in corresponding embodiments, and perform functions similar to those discussed above with respect to the foregoing FIGs.

Figure 5:
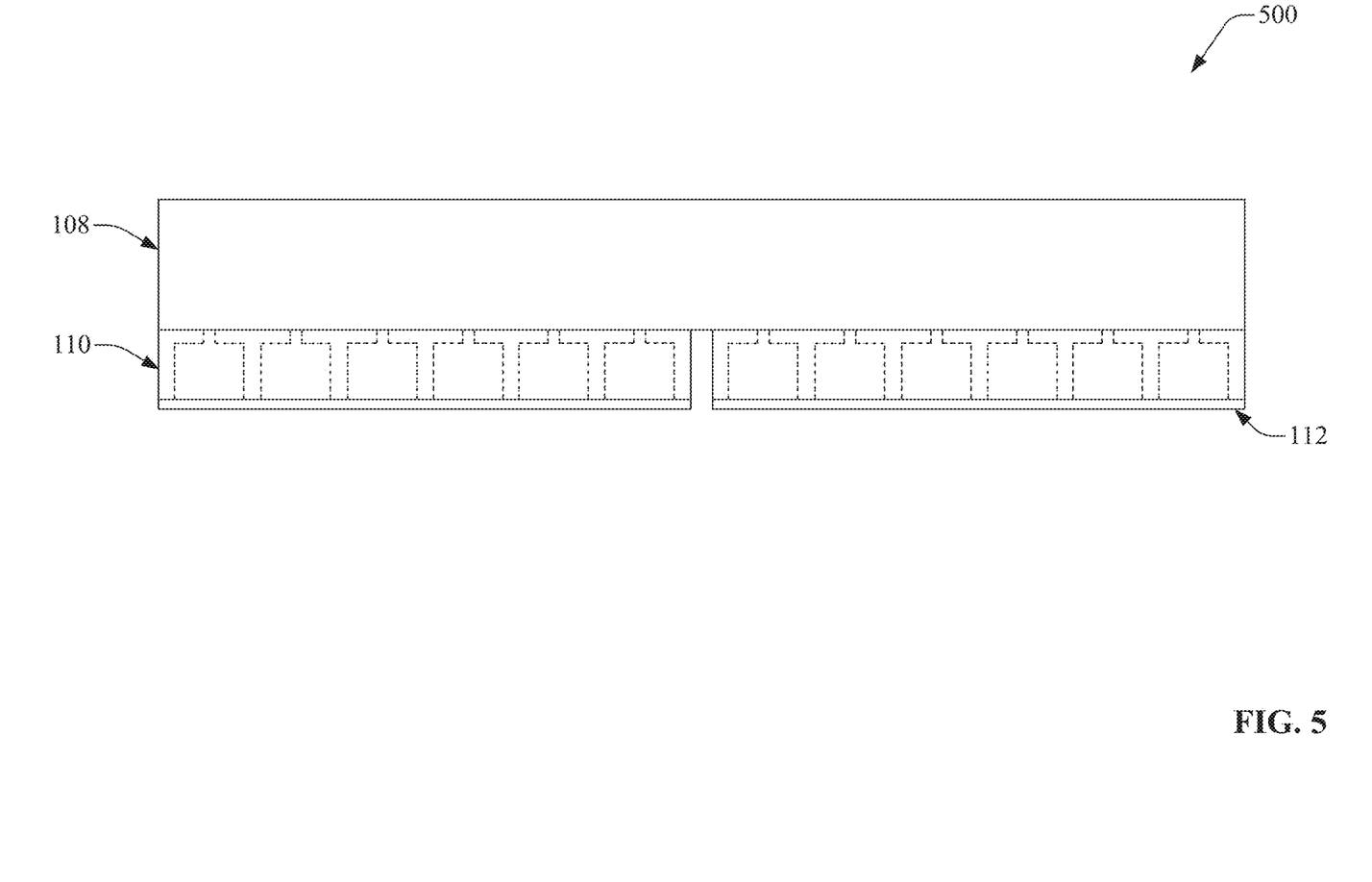
FIG. 5 illustrates a tactile sensor in accordance with one or more embodiments described herein.
Figure 6:
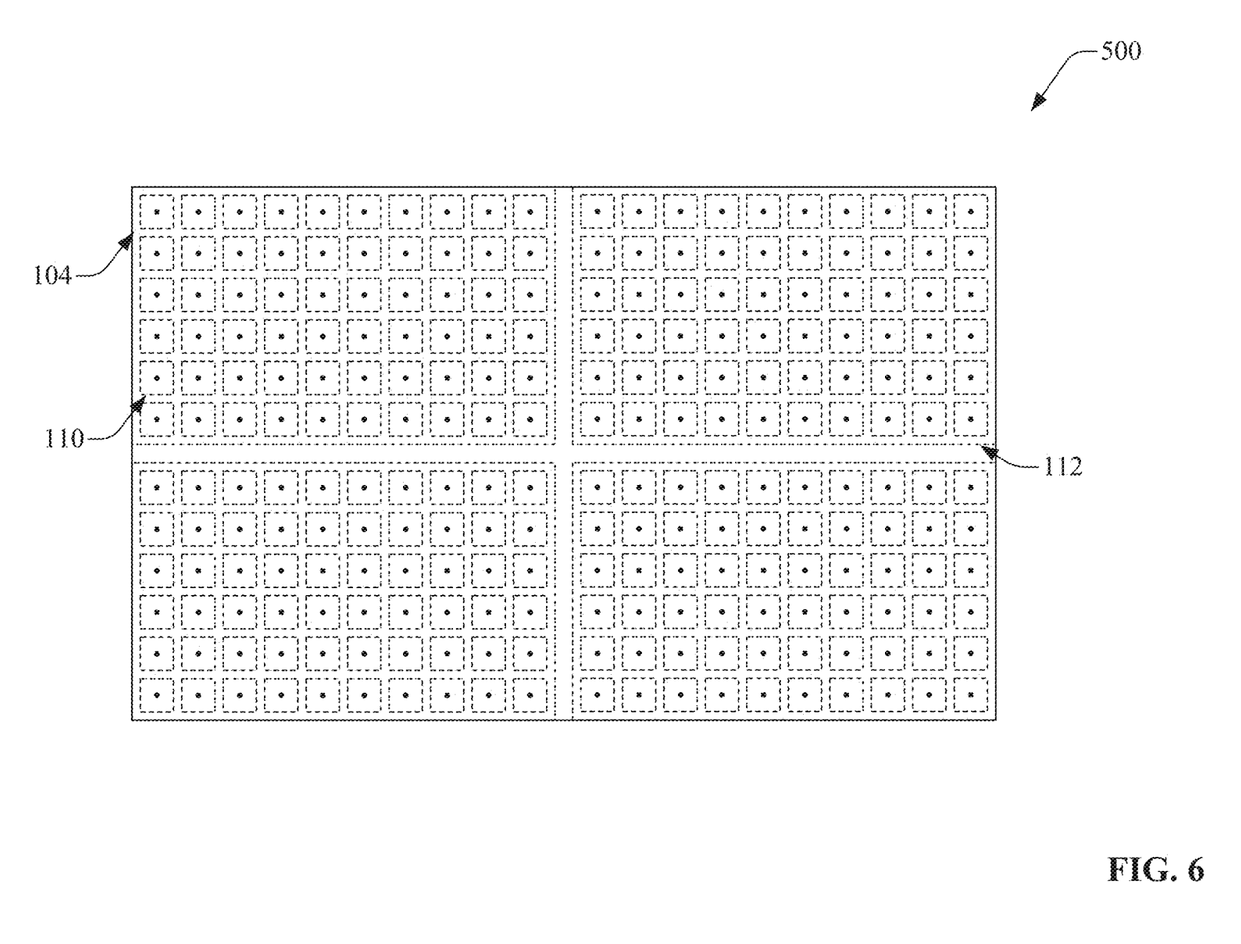
FIG. 6 illustrates a tactile sensor in accordance with one or more embodiments described herein.

FIGS. 5 and 6, respectively depict a side and top view of an exemplary tactile sensor 500 in accordance with various embodiments disclosed herein. Tactile sensor 500 can comprise an elastomer layer 108, pinhole-based structures 110, and CMOS sensors 112.

Tactile sensor 500 is similar to tactile sensor 100, however, tactile sensor 500 utilizes a group of CMOS sensors (e.g., four) under a single elastomer layer 108. According to embodiments herein, various quantities or combinations of CMOS sensors can be utilized. A reflective layer and markers can cover all sensing areas that the elastomer layer 108 covers. Additionally, LEDs can provide illumination. Other embodiments can utilize optical fibers or a combination of LED(s) and/or optical fiber(s).

Further, tactile sensor 500 can comprise gaps between CMOS sensors. Structures atop CMOS sensors can be elastic. In some embodiments, additional flexible or stretchable layers can be bonded at the bottom of CMOS sensors, which will be further discussed in greater detail with reference to subsequent embodiments.

Figure 7:
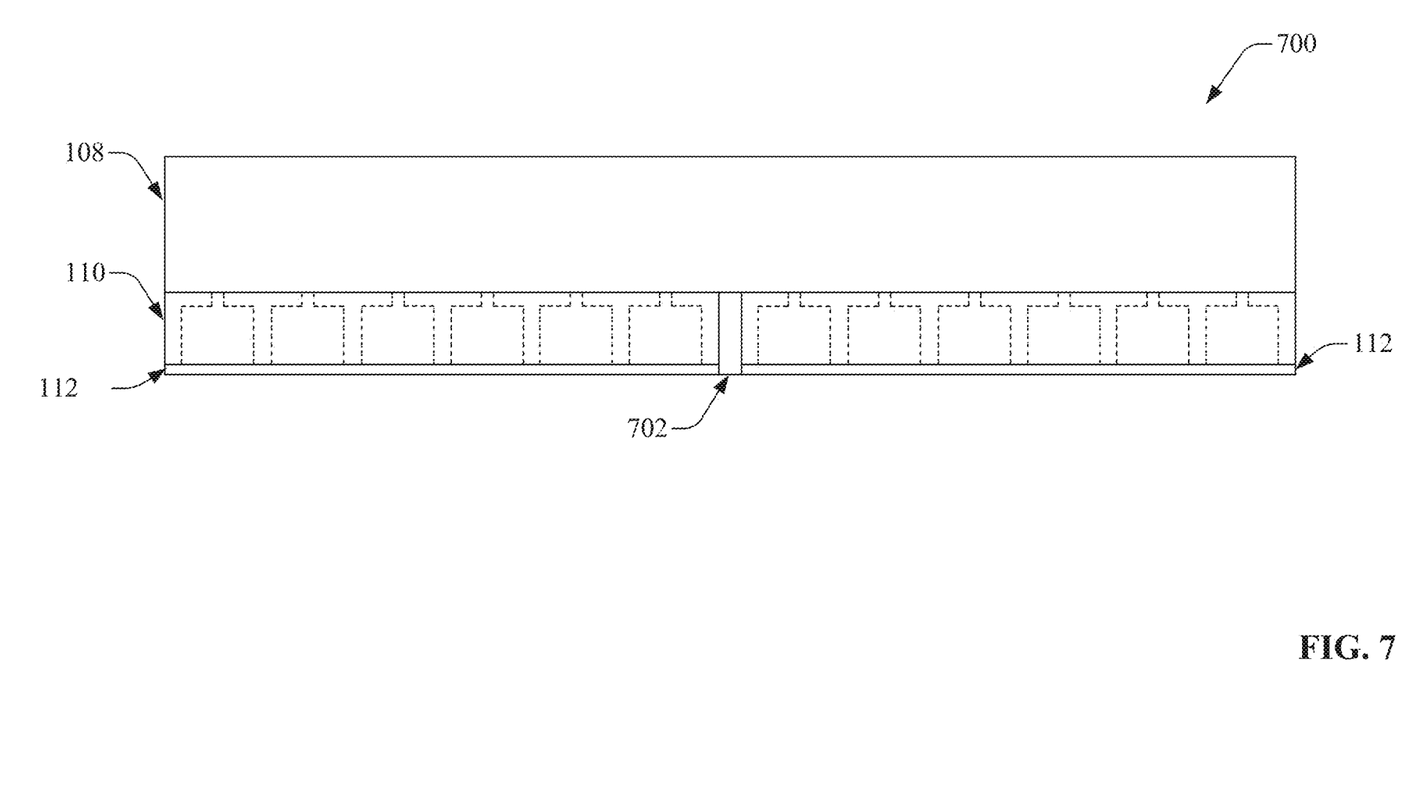
FIG. 7 illustrates a tactile sensor in accordance with one or more embodiments described herein.

Turning now to FIG. 7, there is illustrated an exemplary tactile sensor 700 in accordance with various embodiments disclosed herein. Tactile sensor 700 is similar to tactile sensor 500, however, tactile sensor 700 can additionally comprise a second elastomer layer 702.

Second elastomer layer 702 can connect a plurality of CMOS sensors 112 together. In this regard, and according to an embodiment, the second elastomer layer 702 can fill a gap between a CMOS sensor 112 and an adjacent pinhole-based structure 110. According to another embodiment, the second elastomer layer 702 can fill a gap between adjacent CMOS sensors 112. The elastomer layers 108 and 702 can enable a tactile sensor 700 to be flexible while the CMOS sensors 112 or other components can remain rigid. It can be appreciated that though two CMOS sensors 112 connected by a second elastomer layer 702 are depicted, other combinations of CMOS sensors 112 can be utilized and connected by the second elastomer layer 702.

Figure 8:
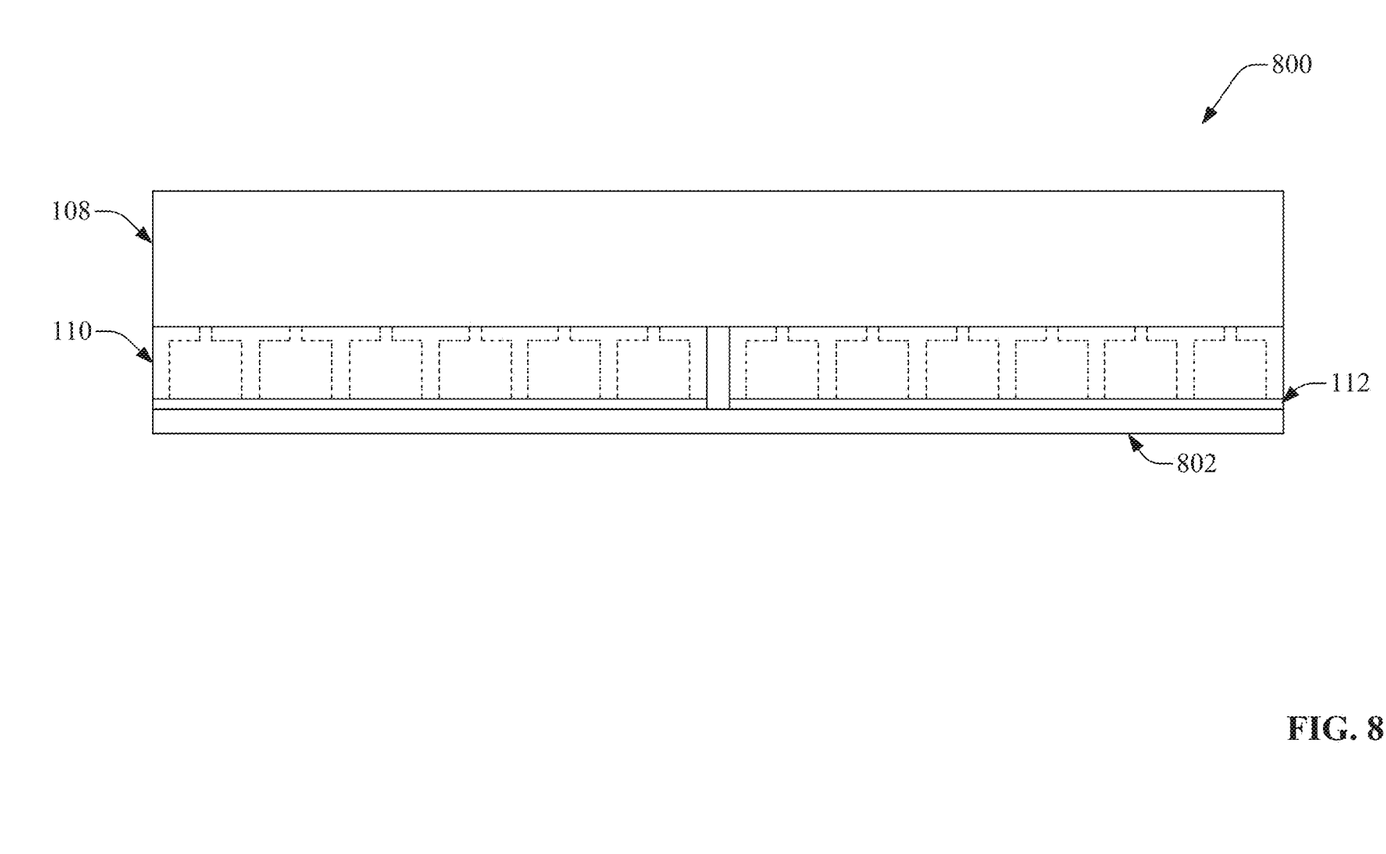
FIG. 8 illustrates a tactile sensor in accordance with one or more embodiments described herein.

Turning now to FIG. 8, there is illustrated an exemplary tactile sensor 800 in accordance with various embodiments disclosed herein. Tactile sensor 800 is similar to tactile sensor 500, however, tactile sensor 800 additionally comprises a bottom elastomer layer 802.

Unlike second elastomer layer 702, bottom elastomer layer 802 is disposed on an entire bottom-side of a tactile sensor 800. Therefore, bottom elastomer layer 802 can be accordingly located regardless of whether or not a second elastomer layer 702 is additionally included. The bottom elastomer layer 802 can cover an entire sensing area, which can provide increased flexibility and increased conformability to human skin. Further, the bottom elastomer layer 802 can offer additional protection for the tactile sensor 800.

Figure 9:
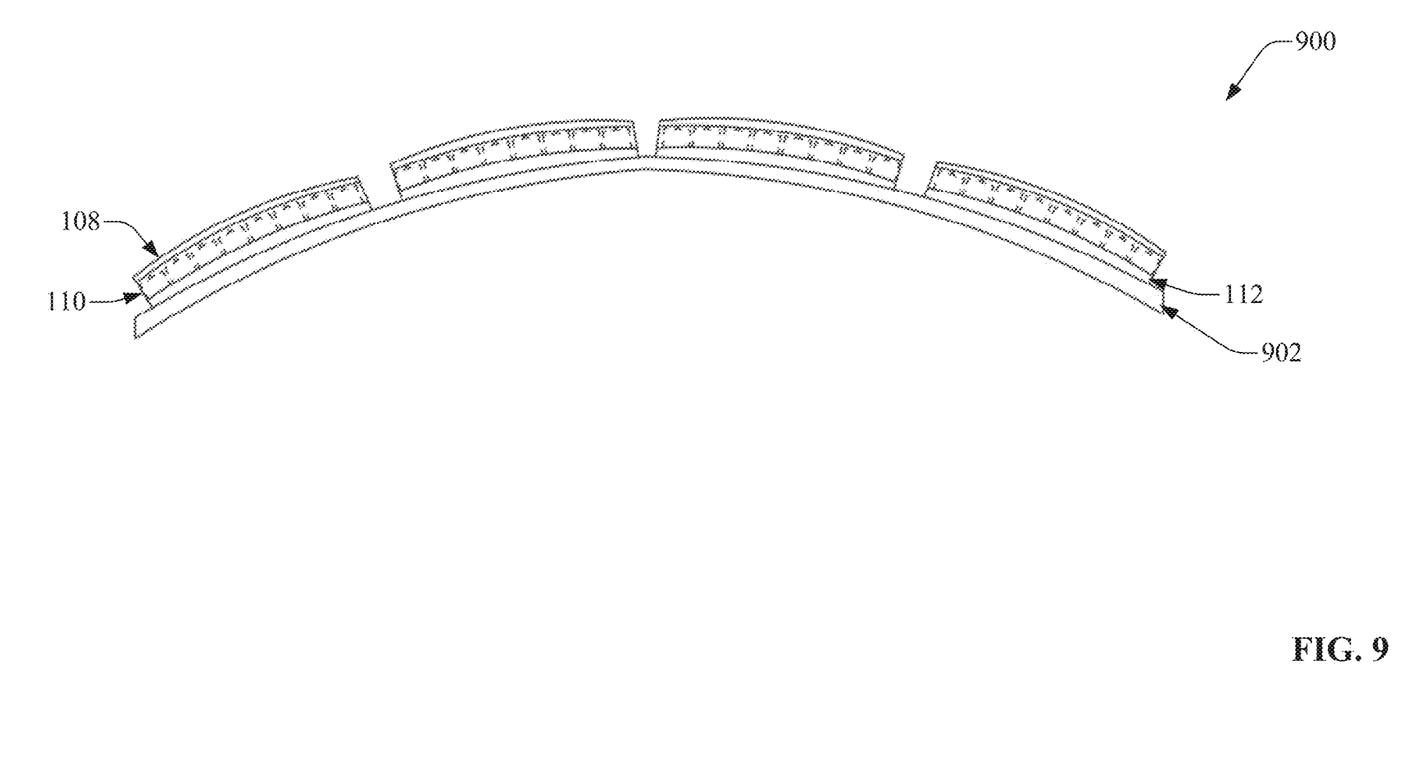
FIG. 9 illustrates a tactile sensor in accordance with one or more embodiments described herein.

Turning now to FIG. 9, illustrated is an exemplary tactile sensor apparatus 900 in accordance with various embodiments disclosed herein. It can be appreciated that the tactile sensor apparatus 900 is depicted in a deformed state in response to, for instance, an external force.

According to an example, tactile sensor apparatus 900 comprises four individual tactile sensors, each comprising an elastomer layer 108, pinhole-based structures 110, and a CMOS sensor 112. It can be appreciated that for each tactile sensor in the tactile sensor apparatus 900, each CMOS sensor 112 has its own elastomer layer 108, unlike with tactile sensor 800. The tactile sensor apparatus 900 can comprise an elastomer layer 902. Each individual tactile sensor can be disposed on the elastomer layer 902, thereby connecting all individual tactile sensors with the elastomer layer 902 to form the tactile sensor apparatus 900.

It can be appreciated that, though the tactile sensor apparatus 900 as depicted comprises four individual tactile sensors, other quantities or distributions of tactile sensors can be utilized or fabricated.

Figure 10A:
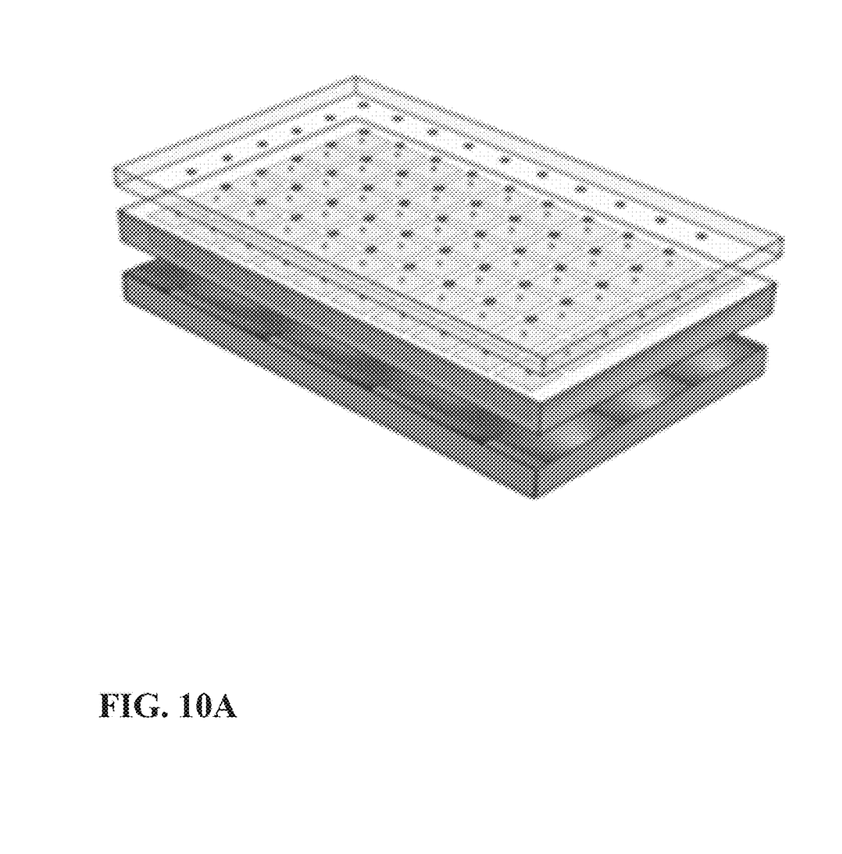
FIGS. 10A and 10B illustrate a tactile sensor in accordance with one or more embodiments described herein.
Figure 10B:
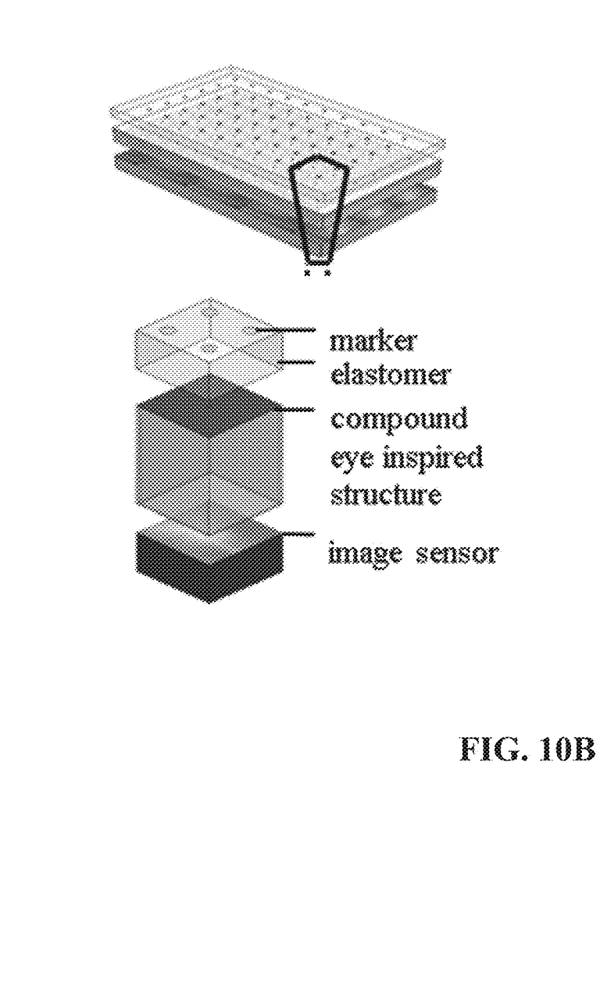

Turning now to FIGS. 10A and 10B, there is illustrated an exemplary tactile sensor in accordance with various embodiments disclosed herein.

FIG. 10A provides a perspective, exploded view of a tactile sensor which is consistent with various embodiments disclosed herein.

FIG. 10B provides a closeup-view of various layers of the tactile sensor shown in FIG. 10A, including markers, an elastomer layer, a compound eye inspired structure (e.g., pinhole-based structures), and an image sensor.

Figure 11:
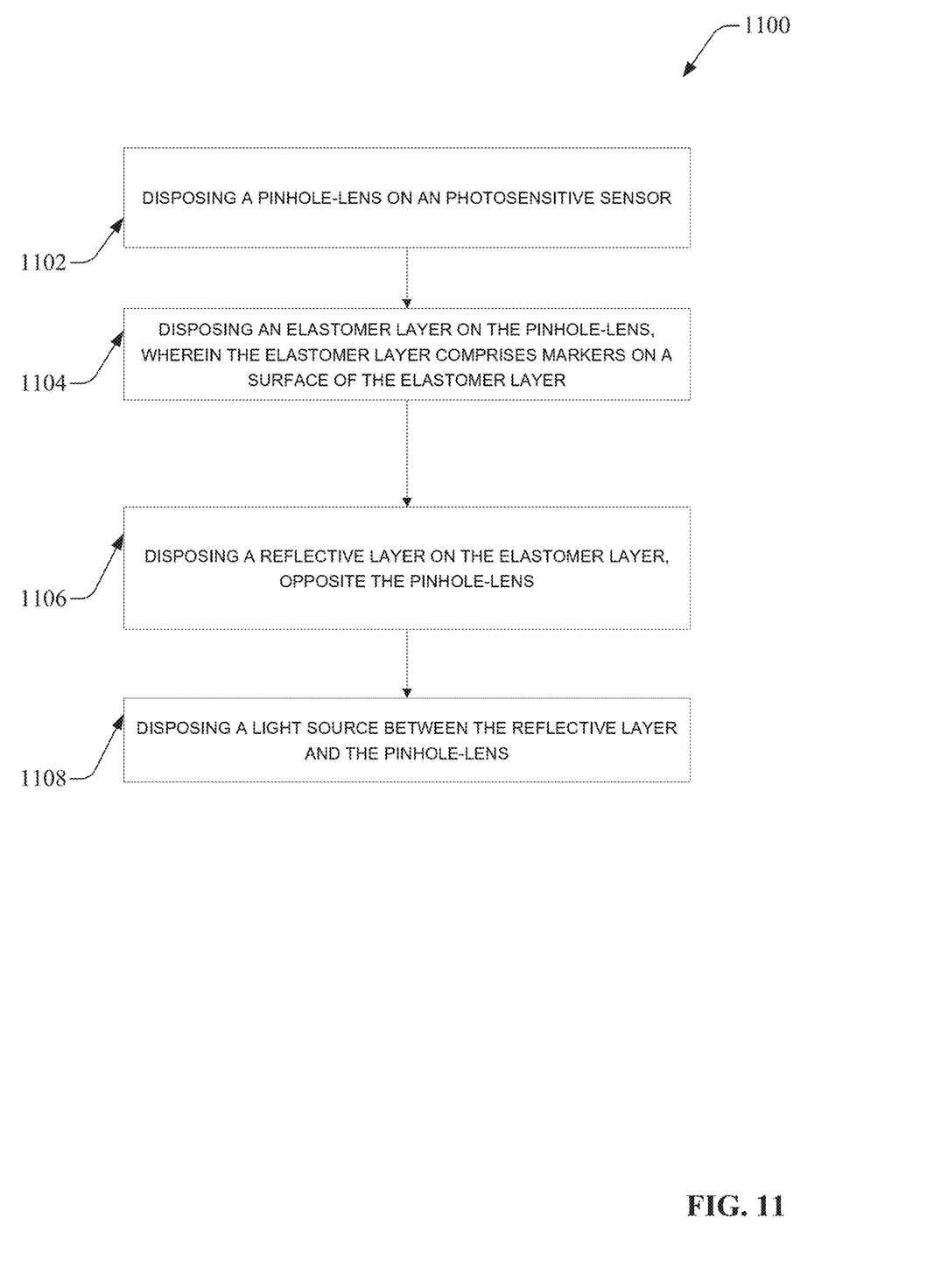
FIG. 11 is a block flow diagram for a method for making a tactile sensor in accordance with one or more embodiments described herein.

FIG. 11 is a flow diagram of a process 1100 for making tactile sensor in accordance with one or more embodiments described herein. At 1102, a pinhole structure is disposed on a photosensitive sensor. At 1104, an elastomer layer is disposed on the pinhole structure, wherein the elastomer layer comprises markers on a surface of the elastomer layer. At 1106, a reflective layer is disposed on the elastomer layer, opposite the pinhole structure. At 1108, a light source is disposed between the reflective layer and the pinhole structure.

FIG. 11 illustrates respective methods or systems in accordance with certain aspects of this disclosure. While, for purposes of simplicity of explanation, the methods or systems are shown and described as a series of acts, it is to be understood and appreciated that this disclosure is not limited by the order of acts, as some acts may occur in different orders and/or concurrently with other acts from those shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A sensing apparatus, comprising:
a photosensitive sensor;
a compound-eye structure on the photosensitive sensor comprising an array of pinhole-based structures etched into a layer comprising the compound-eye structure;
an elastomer layer on the compound-eye structure;
a reflective layer on the elastomer layer, opposite the compound-eye structure; and
a light source that emits light between the reflective layer and the compound-eye structure.

2. The sensing apparatus of claim 1, wherein the light source comprises a light emitting diode or an optical fiber.

3. The sensing apparatus of claim 1, wherein the light source comprises a group of lights adjacently received at a side of each pinhole of the array of pinhole-based structures.

4. The sensing apparatus of claim 1, further comprising markers received on a surface of the elastomer layer, opposite the compound-eye structure.

5. The sensing apparatus of claim 4, wherein deformation of the sensing apparatus causes a marker of the markers to change position relative to the photosensitive sensor, and wherein the photosensitive sensor detects the change of position of the marker.

6. The sensing apparatus of claim 4, wherein deformation of the sensing apparatus causes a marker of the markers to change position relative to the photosensitive sensor, wherein the photosensitive sensor detects the change of position of the marker, and wherein the change of position is used to determine a force distribution of an externally applied pressure that caused the deformation.

7. The sensing apparatus of claim 6, wherein the force distribution of the externally applied pressure is determined based on at least one of a Young's modulus of the elastomer layer or based on a calibration of previously aggregated deformation images corresponding to different applied forces.

8. The sensing apparatus of claim 1, further comprising a transparent rigid layer between the elastomer layer and compound-eye structure.

9. The sensing apparatus of claim 1, further comprising a transparent protective layer on the reflective layer, wherein the transparent protective layer is a first transparent protective layer, and
wherein the sensing apparatus further comprises a second transparent protective layer received on the reflective layer, opposite the first transparent protective layer.

10. The sensing apparatus of claim 1, wherein a pinhole-based structure of the array of pinhole-based structures comprises:
a first hole etched into a first side of the layer comprising the array of pinhole-based structures, and
a second hole etched into a second side of the layer comprising the array of pinhole-based structures, opposite the first side.

11. A tactile sensing apparatus, comprising:
a complementary metal oxide semiconductor sensor;
a pinhole structure of a layer on the complementary metal oxide semiconductor sensor, wherein the pinhole structure is etched into the layer;
an elastomer layer on the pinhole structure;
a reflective layer on the elastomer layer, opposite the pinhole structure; and
a light source on a surface of the elastomer layer.

12. The tactile sensing apparatus of claim 11, further comprising a pinhole structure array, wherein the pinhole structure array comprises the pinhole structure.

13. The tactile sensing apparatus of claim 12, wherein each pinhole structure of the pinhole structure array comprises a supporting square hole of a group of supporting square holes etched into the layer.

14. The tactile sensing apparatus of claim 13, further comprising walls between each supporting square hole of the group of supporting square holes, wherein each wall of the walls prevents light entering a first supporting square hole of the group of supporting square holes from entering a second supporting square hole of the group of supporting square holes.

15. The tactile sensing apparatus of claim 11, wherein motion of markers received on the elastomer layer are recorded by the complementary metal oxide semiconductor sensor and the motion is processed for use in a determination of deformation and force mapping.

16. The tactile sensing apparatus of claim 15, wherein the complementary metal oxide semiconductor sensor is a first complementary metal oxide semiconductor sensor and the motion is cross-referenced with information received from a second complementary metal oxide semiconductor sensor to determine deformation and a slip ratio distribution of a surface to which the first complementary metal oxide semiconductor sensor and the second complementary metal oxide semiconductor sensor are attached.

17. A method for making a tactile sensor, comprising:
disposing a material layer on a photosensitive sensor;
etching a pinhole structure into the material layer;
disposing an elastomer layer on the pinhole structure, wherein the elastomer layer comprises markers on a surface of the elastomer layer;
disposing a reflective layer on the elastomer layer, opposite the pinhole structure; and
disposing a light source between the reflective layer and the pinhole structure.

18. The method of claim 17, wherein the pinhole structure comprises a light passage.

19. The method of claim 17, wherein the markers contrast with the reflective layer, and wherein the markers are distributed according to a pattern.

20. The method of claim 17, wherein the pinhole structure comprises a circular hole etched into a first side of a material and a square hole etched into a second side, opposite the first side, of the material.

* * * * *